United States Patent [19]
Chang

[11] Patent Number: 5,374,403
[45] Date of Patent: Dec. 20, 1994

[54] APPARATUS FOR INCINERATING HAZARDOUS WASTE

[75] Inventor: Robert C. W. Chang, Martinez, Ga.

[73] Assignee: The United States of America as represented by the United States Department of Energy, Washington, D.C.

[21] Appl. No.: 90,272

[22] Filed: Jul. 13, 1993

[51] Int. Cl.⁵ .............. B01D 50/00; G05D 7/00; A62B 1/00; F23B 5/00
[52] U.S. Cl. .............. 422/168; 422/110; 422/125; 422/182; 422/184; 422/307; 110/211; 110/346
[58] Field of Search ........... 422/168, 182, 184, 307, 422/125, 126, 110; 110/211, 235, 246, 254, 346, 226, 302

[56] References Cited
U.S. PATENT DOCUMENTS

| | | | |
|---|---|---|---|
| 2,146,531 | 2/1939 | Craigie | 110/254 |
| 2,238,161 | 4/1941 | Drew et al. | 110/246 |
| 2,297,808 | 10/1942 | Soucy | 169/61 |
| 3,436,061 | 4/1969 | Zinn | 110/246 |
| 3,487,794 | 1/1970 | Willey | 110/246 |
| 3,716,339 | 2/1973 | Shigaki et al. | 110/226 |
| 3,785,306 | 1/1974 | Jaget et al. | 110/246 X |
| 3,882,800 | 5/1975 | du Chambon | 110/212 |
| 4,167,146 | 9/1979 | Wirth | 110/251 |
| 4,301,750 | 11/1981 | Fio Rito et al. | 110/346 |
| 4,557,203 | 12/1985 | Mainord | 110/215 X |
| 4,580,505 | 4/1986 | Golden | 110/302 |
| 4,702,178 | 10/1987 | Welsh | 110/215 X |
| 4,765,255 | 8/1988 | Chiarva | 110/246 X |
| 4,915,038 | 4/1990 | Sujata et al. | 110/346 |
| 4,949,652 | 8/1990 | Hadley | 110/215 |
| 4,958,578 | 9/1990 | Houser | 110/246 |
| 4,974,527 | 12/1990 | Auge | 110/246 X |
| 5,158,025 | 10/1992 | Johnson | 110/235 |
| 5,183,646 | 2/1993 | Anderson et al. | 422/182 |

*Primary Examiner*—Robert J. Warden
*Assistant Examiner*—Christopher Y. Kim
*Attorney, Agent, or Firm*—Brian R. Tumm; Harold M. Dixon; William R. Moser

[57] ABSTRACT

An apparatus for incinerating wastes, including an incinerator having a combustion chamber, a fluidtight shell enclosing the combustion chamber, an afterburner, an off-gas particulate removal system and an emergency off-gas cooling system. The region between the inner surface of the shell and the outer surface of the combustion chamber forms a cavity. Air is supplied to the cavity and heated as it passes over the outer surface of the combustion chamber. Heated air is drawn from the cavity and mixed with fuel for input into the combustion chamber. The pressure in the cavity is maintained at least approximately 2.5 cm WC (about 1" WC) higher than the pressure in the combustion chamber. Gases cannot leak from the combustion chamber since the pressure outside the chamber (inside the cavity) is higher than the pressure inside the chamber. The apparatus can be used to treat any combustible wastes, including biological wastes, toxic materials, low level radioactive wastes, and mixed hazardous and low level transuranic wastes.

19 Claims, 1 Drawing Sheet

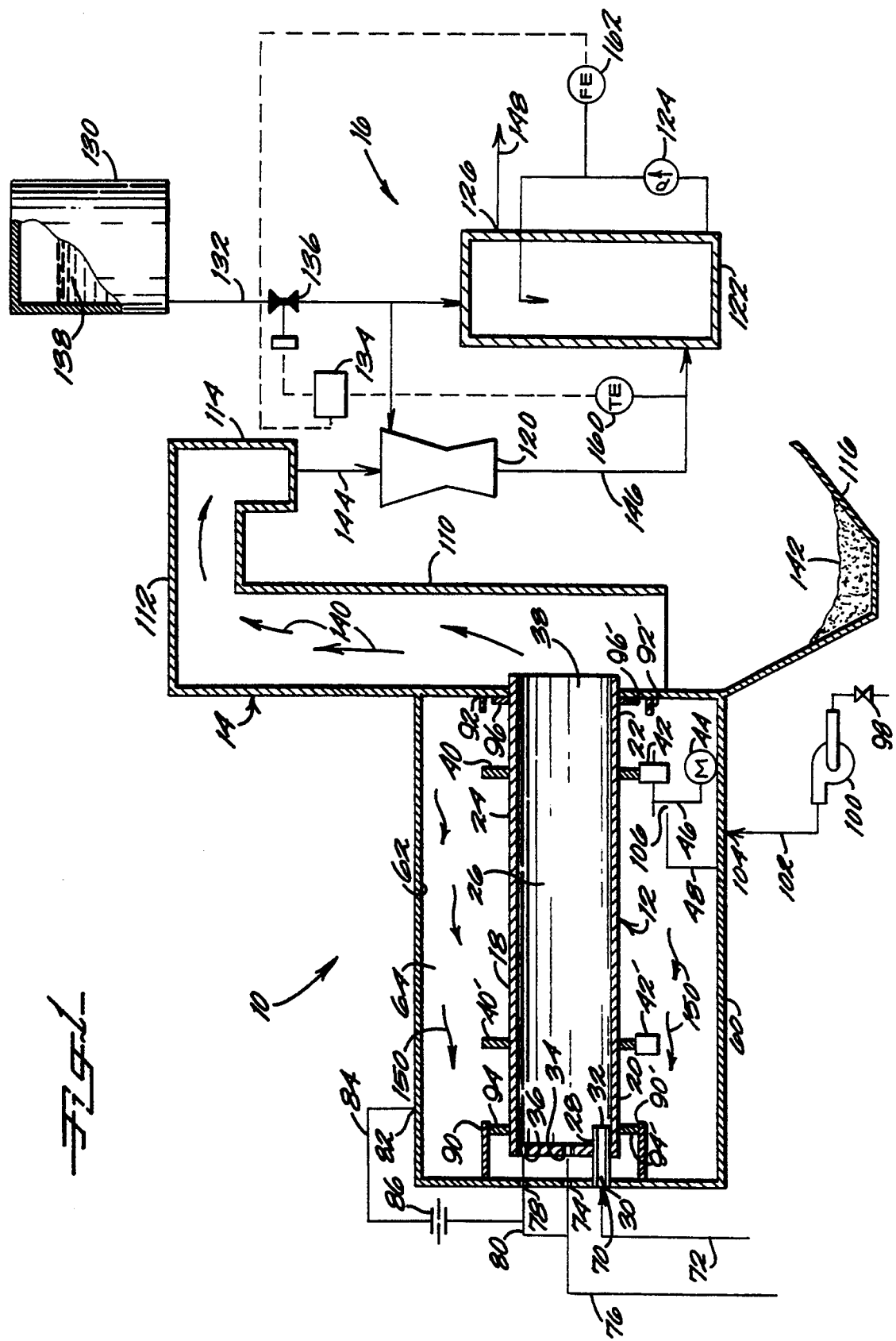

APPARATUS FOR INCINERATING HAZARDOUS WASTE

BACKGROUND OF THE INVENTION

1. Field of the Invention

The present invention relates to an apparatus for incinerating hazardous wastes. In particular, the present invention relates to a system for safer and more efficient incineration of hazardous waste. The United States Government has rights in this invention pursuant to Contract No. DE-AC09-89SR18035 between the U.S. Department of Energy and Westinghouse Savannah River Company.

2. Discussion of Background

The safe and effective disposal of hazardous wastes, including biological wastes, toxic materials, low level radioactive wastes, and mixed hazardous and low level transuranic (TRU) wastes, presents an ever-growing problem. Hazardous wastes are frequently stabilized for disposal by incorporating them into a stable matrix such as glass or cement before burial in geologically stable formations. Before disposal, the wastes may be treated by incineration or other means to reduce the waste volume. Incineration also reduces some hazardous waste constituents to a harmless form.

A number of incinerators for waste treatment are known. Zinn (U.S. Pat. No. 3,436,061) discloses a rotating furnace constructed of segments in telescoping relationship. Drew, et al. (U.S. Pat. No. 2,238,161) describe a tandem rotary incinerator. Du Chambon (U.S. Pat. No. 3,882,800) shows a fluidtight rotary furnace equipped with an outer casing that turns jointly with the furnace and forms an ash storage receptacle. Auge (U.S. Pat. No. 4,974,527) discloses a mobile incinerator system for low level radioactive solid waste.

Incinerators may be equipped with jackets or skirts surrounding the combustion chamber. Gas can be supplied to the region between the combustion chamber and the jacket to heat, cool, or aerate the system. Chiarva (U.S. Pat. No. 4,765,255) describes such an apparatus, wherein a rotating incinerator is heated by hot gas supplied to the region between a fluidtight skirt and the incinerator. Willey (U.S. Pat. No. 3,487,794) encloses an inclined rotary perforated tube with stationary outside shells divided into an upper jacket and a lower jacket, forming upper and lower air chambers surrounding the tube. The upper jacket receives air under pressure from air blowers; the upper chamber receives combustion gases and smoke from the interior of the tube. Jaget, et al. (U.S. Pat. No. 3,785,306) enclose a rotating incinerator with two generally concentric jackets, an inner jacket and an outer jacket. The jackets have openings that communicate with each other and with the atmosphere. The apparatus is cooled by circulating air between the two jackets.

Conventional incinerators are not suitable for treating hazardous wastes, due to their potential for venting volatile wastes and combustion products to the atmosphere if a malfunction occurs in the incinerator or exhaust system. All potential leakage sites must be tightly sealed to prevent venting hazardous waste constituents to the atmosphere, including air, fuel, and waste inlets, and, for rotary incinerators, seals between the fixed and rotating portions of the incinerator. The need for exceptionally fluidtight seals has limited applications of incinerator technology to waste treatment. Seal assemblies having primary, secondary and tertiary seals are found in hazardous and mixed waste incinerators. Such complex seals require frequent maintenance with associated down-time of the system.

SUMMARY OF THE INVENTION

According to its major aspects and broadly stated, the present invention is an apparatus for incinerating wastes. The apparatus includes an incinerator, an afterburner, an off-gas particulate removal system, and an emergency off-gas cooling system. The incinerator may be a rotary incinerator such as are known in the art, or some other type of incinerator such as a liquid injection incinerator, or an ashing or slagging rotary kiln. The combustion chamber of the incinerator is enclosed by a fluidtight shell or housing. The housing is spaced apart from the outer surface of the combustion chamber so that the region between the housing and the chamber forms a cavity. Air supplied to the cavity is heated as it passes over the outer surface of the combustion chamber. Heated air is drawn from the cavity into an air supply line and mixed with fuel for input into the combustion chamber.

During operation of the apparatus, the pressure in the cavity is maintained at a higher level than the pressure inside the chamber so gases cannot leak from the interior of the chamber. Thus, the need for complex, high-maintenance seals is reduced. The apparatus can be used to treat any combustible wastes, including biological wastes, toxic materials, low level radioactive wastes, and mixed hazardous and low level transuranic wastes.

An important feature of the present invention is the dual use of the cavity as both a pressurized chamber to prevent leaks from the combustion chamber and as a source of preheated air (or the oxygen in the air) for input to the combustion chamber. Preheating air for a combustion chamber is well known but not a preheating chamber that also, through a slight over-pressurization, prevents leaks. This dual use makes the present invention much more efficient and safer than conventional designs.

The housing is an important feature of the present invention. The housing maintains the pressure outside the combustion chamber at a higher level than the pressure inside the chamber, so gases cannot leak from inside the chamber. The pressure inside the combustion chamber and the pressure inside the cavity can be regulated by controlling the amount of air input to the cavity, and the amount of air withdrawn from the cavity through the air supply line.

The pressure $P_2$ inside the cavity is preferably at least approximately 2.5 cm water column (WC) (about 1.0" WC) higher than $P_1$, the pressure inside the combustion chamber, and may be as high as approximately 38 cm WC (about 15" WC) above $P_1$. $P_1$ is increased by increasing the flow of air into the combustion chamber, reduced by reducing the flow of air into the chamber. $P_2$ is increased by increasing the amount of air supplied to the cavity, and/or by reducing the amount of preheated air withdrawn from the cavity. Conversely, $P_2$ is reduced by reducing the amount of air supplied to the cavity, and/or by increasing the amount withdrawn from the cavity. Since $P_2$ is always higher than $P_1$, no air—and no hazardous volatile waste constituents and combustion products—can leak out of the combustion chamber. Therefore, exceptionally fluid-tight seals, or complex seal assemblies having primary, secondary and tertiary seals need not be used in the apparatus. The apparatus may be operated at or near atmospheric pressure, with $P_1$ at least approximately 2.5 cm WC (about 1.0" WC) less than atmospheric pressure ($P_{atm}$). However, the apparatus may be operated at other pressures if desired.

Another feature of the present invention is the air distribution system of the apparatus. Air is supplied to the cavity by a fan or blower. The air is heated as it passes across the warm outer surface of the combustion chamber. The heated air is withdrawn from the cavity and mixed with fuel for input into the combustion chamber. Alternatively, heated air is directly admitted into the combustion chamber. Thus, a substantial portion of the heat lost through the surface of the combustion chamber is recovered in the form of preheated air for combustion inside the chamber. In addition, the outer surface of the combustion chamber is cooled as the air sweeps across the surface, so the refractory shell can be made thinner.

Still another feature of the present invention is the emergency off-gas cooling system. The off-gas system of the apparatus may include one or more particulate removal devices such as filters, demisters, Venturi scrubbers, and so forth for treating off-gas emitted from the afterburner. The treated off-gas is then sent to a scrubber and discharged to the atmosphere. A fluid source is connected to the particulate removal device and the scrubber by a conduit. A normally-closed valve is disposed in the conduit. A sensor is operatively connected to the valve, suitably positioned to measure the off-gas temperature. When the off-gas temperature exceeds a preselected value, the valve opens and fluid, preferably water, flows through the conduit into the scrubber to cool the off-gas and prevent the escape of volatile combustion byproducts to the atmosphere. If desired, the valve also opens in the event of a power failure or a malfunction in the apparatus.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a cross-sectional, schematic view of an apparatus according to a preferred embodiment of the present invention.

DETAILED DESCRIPTION OF A PREFERRED EMBODIMENT

An apparatus for incinerating wastes includes an incinerator, an afterburner, a particulate removal system and/or an off-gas scrubbing system. The combustion chamber of the incinerator is enclosed by a fluid-tight shell. During operation of the apparatus, the pressure in the region between the shell and the outer surface of the combustion chamber is maintained at a higher level than the pressure inside the chamber. Air—and volatile wastes and combustion products—cannot leak from the interior of the chamber; air will always leak into the chamber. Thus, the need for complex, high-maintenance seals is reduced.

Referring now to FIG. 1, there is shown a cross-sectional view of an apparatus according to a preferred embodiment of the present invention. Apparatus 10 has an incinerator section 12, an afterburner section 14, and an off-gas section 16. Incinerator section 12 includes a combustion chamber 18, with a first end 20, a second end 22, an outer surface 24 and an interior 26. Combustion chamber 18 has a loading chamber 28 at first end 20, for admitting wastes into chamber 18. Loading chamber 28 has a first gate 30 and a second gate 32. Fuel and an air/fuel mixture are admitted to chamber 18 at inlets 34 and 36, respectively. Solid and gaseous products generated by combustion of wastes in chamber 18 are withdrawn at an exit 38.

Incinerator 12 preferably includes a rotary incinerator such as is known in the art. Combustion chamber 18 is carded by a plurality of roller supports such as supports 40, 40' and turned by rotors 42, 42'. A motor 44 is operatively connected to rotors 42, 42' via a linkage 46 for turning rotors 42, 42' to rotate combustion chamber 18, as indicated schematically in FIG. 1. Motor 44 is contained in a motor housing 48. Alternatively, incinerator 12 may be some other type of incinerator, such as a liquid injection incinerator, or an ashing or slagging rotary kiln. Incinerator 12 is provided with suitable means for regulating the input of air, fuel, and wastes into combustion chamber 18 (not shown).

Incinerator 12 is enclosed by an outer shell or housing 60. The region between the inner surface 62 of shell 60 and the outer surface 24 of combustion chamber 18 forms an annular cavity 64. Incinerator 12 and shell 60 may be approximately cylindrical. However, either incinerator 12 or shell 60, or both, may assume some other convenient form. Shell 60 has an inlet 70 for a waste supply line 72, an inlet 74 for a fuel supply line 76, an inlet 78 for an air/fuel supply line 80, and an outlet 82 for an air supply line 84. Air/fuel supply line 80 is in fluid communication with fuel line 76 and air line 84 for mixing air and fuel supplied to combustion chamber 18. Waste supply line 72 enters loading chamber 28 at gate 30. Fuel supply line 76 and air/fuel supply line 80 enter combustion chamber 18 at inlets 34 and 36, respectively.

Air supply line 84 has a device 86 disposed therein for regulating the pressure differential between combustion chamber 18 (pressure $P_1$) and cavity 64 (pressure $P_2$). Device 86 may be a damper, or an orifice plate wherein the pressure differential is determined by the size of the orifice. Waste supply line 72 includes a valve or other suitable means for controlling the flow of waste materials into chamber 18. Similarly, fuel line 76 and air/fuel line 80 include valves for controlling the amount of fuel supplied to chamber 18 at inlet 34, and the admixture of fuel and air supplied at inlet 36, respectively. If desired, air may be supplied directly to chamber 18 without mixing the air with fuel.

Shell 60 is sealably attached to combustion chamber 18 and afterburner section 14 at gates 90, 90', 92, 92' by seals 94, 94', 96, 96', respectively. Seals 94, 94', 96, 96' are any conventional seals that are suitable for sealing incinerator 12 to shell 60 and afterburner section 14. Fuel supply line 76, air/fuel supply line 80 and air supply line 84 may be attached to shell 60 by welding, brazing, or other means that produces a substantially fluid-tight seal.

A fan 100, preferably a variable speed fan, supplies air to cavity 64 via an air supply line 102. If desired, a damper 98 is provided, positioned as indicated in FIG. 1. Supply line 102 enters shell 60 at an inlet 104, positioned near second end 22 of combustion chamber 18. Air supplied by fan 100 enters motor housing 48, then passes into cavity 64 through an inlet 106. In cavity 64, the air passes from near second end 22 to near first end 20 of combustion chamber 18. The air is heated by thermal contact with exterior surface 24 of chamber 18. Heated air is drawn from cavity 64 through air supply line 84. The heated air is mixed with fuel in air/fuel supply line 80, and enters combustion chamber 18 at inlet 36.

Afterburner section 14 includes a gas passage 110, an afterburner or post-combustion chamber 112, and an off-gas exit 114. Gas passage 110 is typically perpendicular to the major horizontal axis of combustion chamber 18, as indicated in FIG. 1. Exit 38 of combustion chamber 18 opens into gas passage 110. Solid combustion products (ash) are discharged from end 38 into an ash collector 116; gaseous combustion products are drawn through gas passage 110 into afterburner 112.

Off-gas section 16 includes emissions control devices such as a particulate removal device 120 and a scrubber 122 with recirculating pump 124. Device 120 may be a Venturi irrigator, wherein water is sprayed to mix with the off-gas and to enable removal of solid particles which might appear in the off-gas. Alternatively, device 120 may be a cyclone separator, a device such as the Calvert gas cleaning system made by Air Pollution Technology, Inc., or some other suitable particulate removal device. If desired, off-gas section 16 may include other devices, including but not limited to de-misters, filters and heat exchangers, for treating off-gas emitted at exit 114. The treated off-gas is discharged from scrubber 122 at an exit 126. If apparatus 10 is used for processing radioactive wastes, off-gas section 16 may include an activity detector operatively connected to incinerator section 10 and afterburner section 14, to shut down operations when the activity level of the off-gas exceeds a preselected limit.

An emergency off-gas cooling system is provided for section 16. A fluid source 130 is connected to particulate removal device 120 and scrubber 122 by a conduit 132. A temperature-sensing element 160 is positioned to measure the temperature of off-gas emitted by off-gas exit 114 or particulate removal device 120. Element 160 is operatively connected to a logic block 134, which in turn is operatively connected to a valve 136 disposed in conduit 132. When the off-gas temperature exceeds a preselected value, vane 136 opens, and fluid 138, preferably water, flows through conduit 132 to particulate removal device 120 and scrubber 122. The fluid contacts the off-gas in device 120 and scrubber 122, cooling the gas.

The larger the contact area of fluid 138 and the off-gas in particulate removal device 120 and scrubber 122, the more efficient the cooling process. Therefore, fluid 138 preferably reaches device 120 and scrubber 122 in the form of small droplets with a large total surface area. Fluid source 130 may be a water tank, preferably disposed at a sufficient height above device 120 and scrubber 122 that the elevation of the tank provides adequate water pressure for water atomization. The optimum height of source 130 is best determined in view of the types of wastes to be treated, the expected off-gas temperatures and constituents, and such other factors as will be apparent to one of ordinary skill. If desired, conduit 132 may terminate in sprinklers or other means for dispersing fluid 138.

Valve 136 is a normally-closed valve, so that no water passes through conduit 132 until element 160 determines that the preselected temperature limit has been exceeded. Valve 136 may be closed manually when the temperature is reduced to a safe level. Alternatively, valve 136 may close automatically when the temperature drops below a second, lower preselected value. Valve 136 may be controlled, for example, by a solenoid relay. If desired, valve 136 may open in the event of a power failure. By way of example, interruption or failure of the power to apparatus 10 will cause a drop in the flow rate or pressure supplied by pump 124. As shown schematically in FIG. 1, a flow element 162 is operatively connected to pump 124 of off-gas system 16. Element 162 may, for example, monitor the flow through pump 124 and, through logic block 134, trigger opening of valve 136 if the flow rate drops below a predetermined level. Alternatively, element 162 may be a pressure-sensing element that opens valve 136 if the fluid pressure drops below a predetermined level. If desired, additional sensors may be provided to monitor the operation of the other components of apparatus 10, such as incinerator 12, afterburner 14, blower 100, particulate removal device 120 and scrubber 122, operatively connected to valve 136 to open the valve if any of these components of apparatus 10 malfunctions.

In operation of apparatus 10, wastes are input into combustion chamber 18 at first gate 30 of loading chamber 28. Preferably, only one of gates 30, 32 is open at any time, so interior 26 of chamber 18 is isolated from the atmosphere while the wastes are being input. When gate 30 is closed, gate 32 is opened and the wastes are admitted into chamber 18. Alternatively, gates 30 and 32 are both open and waste is continuously admitted into combustion chamber 18. Loading chamber 28 is preferably fluidtight to prevent escape of volatile wastes and combustion gases to the atmosphere. Fuel is supplied to combustion chamber 18 via fuel line 76, and air via supply line 84. The flow of air into chamber 18 is controlled by adjusting the flow of air through supply line 84, as will be described below. It will be understood that combustion in chamber 18 takes place in the presence of oxygen. Thus, air, oxygen, oxygen-enriched air, or some other oxygen-containing gaseous mixture may be used to support combustion of wastes in chamber 18.

In a typical rotary incinerator, combustion chamber 18 rotates at approximately 0.2-2 revolutions per minute (rpm). The temperature in interior 26 may reach approximately 1400°-1600° F. (about 760°-870° C.) or higher during combustion of wastes in chamber 18. Combustion in chamber 18 typically requires about 15 minutes to 90 minutes, depending on the types of waste and fuel, the air/fuel mixture, the temperature inside chamber 18, and so forth.

As the wastes are rotated and heated in combustion chamber 18, the wastes are oxidized into gaseous and volatile combustion products, represented by arrows 140, and solid combustion products, represented by ash 142. Ash 142 is discharged into ash collector 116 at exit 38. If desired, ash 142 may be removed from collector 116 by a conveyor (not shown).

Gaseous products 140 are blown into gas passage 110, where a suitable blower or fan (not shown) draws products 140 into afterburner 112. Products 140 are incinerated in afterburner 112. Combustion of products 140 yields off-gas 144, which exits afterburner 112 at off-gas exit 114. Afterburner 112 ensures complete combustion of substantially all combustible gases emitted from chamber 18. However, off-gas 144 may contain particulates, volatile organics, and so forth, depending on the types of wastes input into chamber 18. Temperatures in afterburner 112 are typically about 1800°-2200° F. (about 980°-1200° C.), depending on the types of waste input to combustion chamber 18, the operating conditions of incinerator 12, the air/fuel mixture in afterburner 112, and so forth.

Off-gas 144 is passed to device 120, where a substantial portion of the particulates are removed. The resulting off-gas stream 146 is passed to scrubber 122, where the off-gas is cleaned and cooled. Cooled gas 148 is vented to the atmosphere. Temperature element 160, operatively connected to normally-closed valve 136, is positioned in the path of gas stream 146 exiting device 120, or alternatively in the path of stream 144 leaving exit 114. Valve 136 opens when the temperature of gas stream 146 (or stream 144) exceeds a preselected value or in the event of a power failure, dumping water from tank 130 into scrubber 122 to cool the volatile off-gas constituents.

As noted above, air supplied by variable speed fan 100 enters cavity 64 at inlet 106, near second end 22 of combustion chamber 18. Some of the heat generated by combustion of wastes in chamber 18 warms the chamber itself. At least some of this heat is lost by radiation through surface 24. Air supplied through inlet 106 is drawn through cavity 64 from near second end 22 of chamber 18 to near first end 20, as indicated by arrows 150. Surface 24, warmed by combustion inside chamber 18, in turn heats the air in cavity 64, and heated air is drawn into air supply line 84 at outlet 82. The amount of air leaving cavity 64 is regulated by device 86. The heated air is mixed with fuel in air/fuel supply line 80, and the preheated air/fuel mixture enters combustion chamber 18 at inlet 36. Thus, at least a portion of the heat lost through surface 24 is recovered in the form of preheated air entering chamber 18. Since surface 24 of combustion chamber 18 is cooled as air sweeps across the surface, the thickness of the refractory layers of combustion chamber 18 can be reduced.

Preferably, combustion chamber 24 and afterburner 112 are both operated continuously. Combustion chamber 18 is provided with means for adjusting the fuel/air/waste mixture to provide suitable combustion conditions for the waste. Typically, temperature and pressure sensors are positioned in interior 26 of combustion chamber 18 and in gas passage 110. The sensors monitor the temperature and pressure inside chamber 18 and gas passage 110, and use these readings to regulate the flow of waste materials, fuel and air into chamber 18. The air/fuel mixture input into combustion chamber 18 is adjusted by adjusting damper 98 and/or the speed of fan 100. As is known in the art, the fuel/air/waste mixture in combustion chamber 18 needs to be adjusted depending on factors such as the types of waste and fuel, the combustion temperature and combustion rate of the waste, the capacity of incinerator 12, and so forth. The operating temperature and fuel consumption are continuously monitored, and waste, fuel and air input are continuously adjusted to maintain the efficiency of the process.

During operation of incinerator 12, shell 60 acts as an air inlet plenum for incinerator 12. Cavity 64 is slightly pressurized compared to interior 26 of combustion chamber 18. The pressure difference between cavity 64 and interior 26 is maintained by adjusting the flow of air into and out of cavity 64 and through device 86. Air flow into cavity 64 is controlled by adjusting the amount supplied by variable speed fan 100.

Apparatus 10 may be operated at or near atmospheric pressure, or other pressures if desired. To prevent leakage from combustion chamber 18, the pressure inside shell 60 (but outside chamber 18) is always higher than the pressure inside chamber 18. By way of example, the pressure $P_1$ in interior 26 of chamber 18 may be at least approximately 2.5 cm WC (about 1.0" WC) lower than atmospheric pressure ($P_{atm}$). The pressure $P_2$ inside cavity 64 is at least approximately 2.5 cm WC (about 1.0" WC) higher than $P_1$, and may be 38 cm WC (about 15" WC) above $P_{atm}$ or higher.

$P_2$ is adjusted by controlling the pressure drop across device 86. $P_2$ is increased by increasing the amount of air supplied by fan 100, and reduced by decreasing the amount supplied by fan 100.

$P_1$ is adjusted by adjusting the amount of air input to combustion chamber 18 by a downstream process draft fan (not shown). Air flow through device 86 is increased to increase $P_1$ and reduce $P_2$, reduced to reduce $P_1$ and increase $P_2$. $P_1$, $P_2$, and the difference between $P_1$ and $P_2$ are maintained at the desired levels by adjusting the pressure drop across device 86. Preferably, cavity 64 and combustion chamber 18 are provided with pressure sensors for continuously monitoring $P_1$ and $P_2$, and adjusting the pressure differential between $P_1$ and $P_2$ as needed.

Since air is fed into motor housing 48 by fan 100, the pressure $P_3$ inside housing 48 is higher than $P_2$, the pressure inside cavity 64. $P_2$ is always higher than $P_1$, the pressure inside combustion chamber 18. Therefore, no air—and no hazardous gases and volatile combustion products—can leak out of combustion chamber 18. Leaks, if any, will always be into chamber 18. Even if seals 94, 94', 96, 96' were to fail, or if chamber 18 should leak, any contamination would be contained inside shell 60. Therefore, the seals need not be exceptionally fluid-tight. Since the pressure in cavity 64 is always greater than the pressure inside chamber 18, a small amount of air in-leakage through the seals is acceptable. The seals are preferably durable and easy to replace, such as the labyrinth type or brake lining friction type of kiln seal, the Flex-steel kiln seals made by the Webbco Co., or other suitable types of kiln seal.

An apparatus according to the present invention may include a rotary incinerator such as are known in the art, or some other type of incinerator such as a liquid injection incinerator, or an ashing or slagging rotary kiln. The apparatus can be used to treat any combustible wastes, including solids, slurries, and liquids. Solids and slurries may be incinerated in combustion chamber 18; liquids may be injected directly into afterburner 122. The apparatus can safely incinerate many common types of wastes, including wood, paper, fabric, rubber, cellulose, plastics, and various solvents; and compounds such as ketones, aldehydes, alcohols, amines, esters, ethers, and aliphatic, aromatic and halogenated hydrocarbons. The method is useful for treating biological wastes, toxic materials, low level radioactive wastes, and mixed hazardous and low level transuranic wastes.

It will be apparent to those skilled in the art that many changes and substitutions can be made to the preferred embodiment herein described without departing from the spirit and scope of the present invention as defined by the appended claims.

What is claimed is:

1. An apparatus for incinerating waste materials in the presence of oxygen, said apparatus comprising:
   means for preheating said oxygen;
   an incinerator having an outer surface, an interior, means for admitting said preheated oxygen into said interior, and means for admitting said waste materials into said interior, said interior being at a first pressure;

means for heating said waste materials in the presence of said preheated oxygen to form gaseous and solid combustion products, said heating means producing heat, said heating means in thermal contact with said outer surface of said incinerator so that at least a portion of said heat warms said outer surface;

a housing enclosing said incinerator, said housing spaced apart from said outer surface of said incinerator so that said housing and said outer surface define a cavity having a second pressure; and means for maintaining said second pressure higher than said first pressure to prevent leaks of said combustion products from said incinerator, said means for maintaining comprising a supply line for passing said preheated oxygen from the cavity to the combustion chamber and a means for regulating the pressure differential between the combustion chamber and the cavity.

2. The apparatus as recited in claim 1, wherein said cavity is in fluid connection with said oxygen-admitting means, and wherein said preheating means further comprises means for passing said oxygen through said cavity so that said oxygen is heated by thermal contact with said outer surface of said incinerator.

3. The apparatus as recited in claim 1, wherein said pressure-maintaining means further comprises means for controlling the flow of oxygen into said cavity, said controlling means increasing said flow to increase said second pressure and reducing said flow to reduce said second pressure.

4. The apparatus as recited in claim 1, wherein said oxygen-admitting means further comprises
a conduit having a first end in fluid connection with said cavity and a second end in fluid connection with said interior of said incinerator, and wherein said pressure-maintaining means further comprises means for controlling the flow of said preheated oxygen through said conduit, said controlling means increasing said flow to increase said first pressure and reduce said second pressure, said controlling means reducing said flow to reduce said first pressure and increase said second pressure.

5. The apparatus as recited in claim 1, wherein said preheating means further comprises means for passing said oxygen through said cavity so that said oxygen is heated by thermal contact with said outer surface of said incinerator, and wherein said pressure-maintaining means further comprises:
first means for controlling the flow of oxygen into said cavity, said first controlling means increasing said flow to increase said second pressure and reducing said flow to reduce said second pressure; and
second means for controlling the flow of said heated oxygen into said interior, said second controlling means in fluid connection with said preheating means, said second controlling means increasing said flow to increase said first pressure and reduce said second pressure, said second controlling means reducing said flow to reduce said first pressure and increase said second pressure,
said first controlling means and said second controlling means cooperating to maintain said second pressure at least approximately 2.5 cm WC higher than said first pressure.

6. The apparatus as recited in claim 1, further comprising:
an afterburner receiving said gaseous combustion products from said incinerator, said afterburner incinerating said gaseous products to produce off-gas containing volatile products, said off-gas having a temperature;
means for treating said off-gas to remove said volatile products therefrom, said treating means receiving said off-gas from said afterburner;
means for monitoring said temperature; and
means for cooling said off-gas, said cooling means operative if said temperature exceeds a preselected temperature.

7. The apparatus as recited in claim 1, further comprising:
an afterburner receiving said gaseous combustion products from said incinerator, said afterburner incinerating said gaseous products to produce off-gas containing volatile products, said off-gas having a temperature;
means for treating said off-gas to remove said volatile products therefrom, said treating means receiving said off-gas from said afterburner;
a fluid source;
a conduit extending from said source and discharging into said treating means;
a normally-closed valve disposed in said conduit; and
temperature-sensing means disposed between said afterburner and said treating means, said temperature-sensing means monitoring said temperature of said off-gas and opening said valve if said temperature exceeds a preselected temperature.

8. The apparatus as recited in claim 1, wherein said incinerator is a rotary incinerator.

9. An apparatus for incinerating waste materials in the presence of oxygen, said apparatus comprising:
an incinerator having a wall with an outer surface, an interior, means for admitting oxygen into said interior, and means for admitting said waste materials into said interior, said interior being at a first pressure;
means for incinerating said waste materials in the presence of said oxygen to form gaseous and solid combustion products, said incinerating means producing heat, said incinerating means in thermal contact with said wall of said incinerator so that at least a portion of said heat passes through said wall and warms said outer surface;
a housing enclosing said incinerator, said housing spaced apart from said outer surface of said incinerator so that said housing and said outer surface define a cavity having a second pressure;
means for maintaining said second pressure higher than said first pressure to prevent leaks of said combustion products from said incinerator, said means for maintaining comprising a supply line for passing said preheated oxygen from the cavity to the combustion chamber and a means for regulating the pressure differential between the combustion chamber and the cavity; and
means for passing said oxygen through said cavity so that said oxygen is preheated by thermal contact with said outer surface of said incinerator and said outer surface is cooled thereby, said passing means in fluid connection with said admitting means.

10. The apparatus as recited in claim 9, wherein said passing means further comprises means for supplying oxygen to said cavity, said supplying means increasing the flow of oxygen into said cavity to increase said second pressure and reducing said flow to reduce said second pressure.

11. The apparatus as recited in claim 9, wherein said oxygen-admitting means further comprises:
a conduit having a first end in fluid connection with said cavity and a second end in fluid connection with said interior of said incinerator; and means for controlling the flow of preheated oxygen through said conduit, said controlling means increasing said flow to increase said first pressure and reduce said second pressure, said controlling means reducing said flow to reduce said first pressure and increase said second pressure.

12. The apparatus as recited in claim 9, wherein said second pressure at least approximately 2.5 cm WC higher than said first pressure.

13. The apparatus as recited in claim 9, further comprising:
an afterburner for incinerating said gaseous products, said afterburner releasing off-gas containing volatile products, said off-gas having a temperature;
means in fluid connection with said interior of said incinerator for receiving said combustion products, said receiving means removing said solid products and passing said gaseous products to said afterburner;
means for monitoring said temperature, said monitoring means positioned between said afterburner and said treating means; and
means for cooling said off-gas, said cooling means operative if said temperature exceeds a preselected temperature.

14. The apparatus as recited in claim 9, further comprising:
an afterburner for incinerating said gaseous products, said afterburner releasing off-gas containing volatile products, said off-gas having a temperature;
means in fluid connection with said interior of said incinerator for receiving said combustion products, said receiving means removing said solid products and passing said gaseous products to said afterburner;
a fluid source;
a conduit extending from said source and discharging into said treating means;
a normally-closed valve disposed in said conduit; and
temperature-sensing means disposed between said afterburner and said treating means, said temperature-sensing means monitoring said temperature of said off-gas and operating to open said valve if said temperature exceeds a predetermined maximum.

15. An apparatus for incinerating waste materials in the presence of oxygen, said apparatus comprising:
a combustion chamber having a wall with a first end and a second end, an outer surface, an interior, means for admitting preheated oxygen to said interior, and means for admitting waste materials to said interior, said oxygen-admitting means and said waste-admitting means positioned at said first end, said interior being at a first pressure;
means for heating said waste materials in the presence of said oxygen to form gaseous and solid combustion products, said heating means producing heat, said heating means in thermal contact with said wall of said combustion chamber so that at least a portion of said heat passes through said wall and warms said outer surface;
a housing enclosing said combustion chamber, said housing spaced apart from said outer surface of said chamber so that said housing and said outer surface define an annular cavity having a second pressure;
means for supplying oxygen to said cavity, said supplying means increasing the flow of oxygen into said cavity to increase said second pressure and reducing said flow to reduce said second pressure;
means for drawing said oxygen through said cavity from near said second end to near said first end of said combustion chamber so that said oxygen passes by said outer surface, said oxygen being heated by thermal contact with said outer surface and said surface being cooled thereby, said drawing means in fluid connection with said oxygen-admitting means; and
means for controlling the flow of said heated oxygen into said interior of said combustion chamber, said controlling means in fluid connection with said interior, said controlling means increasing said flow to increase said first pressure and reduce said second pressure, said controlling means reducing said flow to reduce said first pressure and increase said second pressure,
said controlling means and said oxygen-supplying means cooperating to maintain said second pressure higher than said first pressure to prevent leaks of said combustion products from said incinerator, said means for maintaining comprising a supply line for passing said preheated oxygen from the cavity to the combustion chamber and a means for regulating the pressure differential between the combustion chamber and the cavity.

16. The apparatus as recited in claim 15, wherein said drawing means further comprises:
a conduit having a first end in fluid connection with said cavity and a second end in fluid connection with said interior of said combustion chamber; and
means for controlling the flow of said heated oxygen through said conduit, said controlling means increasing said flow to increase said first pressure and reduce said second pressure, said controlling means reducing said flow to reduce said first pressure and increase said second pressure.

17. The apparatus as recited in claim 15, wherein said controlling means and said oxygen-supplying means cooperating to maintain said second pressure at least approximately 2.5 cm WC higher than said first pressure.

18. The apparatus as recited in claim 15, further comprising:
an afterburner receiving said gaseous combustion products from said combustion chamber, said afterburner incinerating said gaseous products to produce off-gas containing volatile products, said off-gas having a temperature;
means in fluid connection with said interior of said combustion chamber for receiving said combustion products, said receiving means removing said solid products and passing said gaseous products to said afterburner;
means for treating said off-gas to remove said volatile products therefrom, said off-gas having a temperature;
a fluid source;

a conduit extending from said source and discharging into said treating means;

a normally-closed valve disposed in said conduit; and temperature-sensing means disposed between said afterburner and said treating means, said temperature-sensing means monitoring said temperature of said off-gas and operating to open said valve if said temperature exceeds a predetermined maximum.

19. The apparatus as recited in claim 15, wherein said apparatus is powered by a source of electricity, further comprising:

an afterburner receiving said gaseous combustion products from said combustion chamber, said afterburner incinerating said gaseous products to produce off-gas containing volatile products, said off-gas having a temperature;

means in fluid connection with said interior of said combustion chamber for receiving said combustion products, said receiving means removing said solid products and passing said gaseous products to said afterburner;

means for treating said off-gas to remove said volatile products therefrom, said off-gas having a temperature;

a fluid source;

a conduit extending from said source and discharging into said treating means;

a normally-closed valve disposed in said conduit; and means for monitoring said source of electricity, said monitoring means sensing the How of current from said source and operating to open said valve if said flow ceases.

* * * * *